(12) United States Patent
Trompen et al.

(10) Patent No.: US 7,682,354 B2
(45) Date of Patent: Mar. 23, 2010

(54) DISPENSER HAVING PIEZOELECTRIC ELEMENTS AND METHOD OF OPERATION

(75) Inventors: Mick A. Trompen, Westfield, IN (US);
Gregory A. Lyon, Indianapolis, IN (US);
Ronald W. Lyon, Noblesville, IN (US);
Steven D. Lubetkin, Zionsville, IN (US); Joseph R. Winkle, Carmel, IN (US); Jeffery A. Meyer, Greenfield, IN (US)

(73) Assignees: Aircom Manufacturing, Inc., Indianapolis, IN (US); Eli Lilly and Company, Indianapolis, IN (US)

( * ) Notice: Subject to any disclaimer, the term of this patent is extended or adjusted under 35 U.S.C. 154(b) by 905 days.

(21) Appl. No.: 10/404,274

(22) Filed: Apr. 1, 2003

(65) Prior Publication Data
US 2004/0199116 A1    Oct. 7, 2004

(51) Int. Cl.
*A61K 9/22* (2006.01)
(52) U.S. Cl. .................. 604/890.1; 604/131; 604/304; 119/665
(58) Field of Classification Search .............. 604/890.1, 604/891.1, 892.1, 131–133, 140, 141, 146, 604/151, 153, 19, 20, 304–308, 310; 119/650, 119/652, 653, 655, 660, 665, 677; 222/129.1, 222/187, 251, 420–422
See application file for complete search history.

(56) References Cited

U.S. PATENT DOCUMENTS

| | | |
|---|---|---|
| 3,465,724 A | 9/1969 | Broadbent |
| 3,541,995 A | 11/1970 | Fathauer |
| 3,756,200 A | 9/1973 | Ohlhausen |
| 3,781,837 A | 12/1973 | Anderson et al. |
| 3,840,009 A | 10/1974 | Michaels et al. |
| 3,893,111 A | 7/1975 | Cotter |
| 3,902,084 A | 8/1975 | May |
| 3,929,277 A | 12/1975 | Byrne et al. |
| 3,935,839 A | 2/1976 | Goodwin |

(Continued)

FOREIGN PATENT DOCUMENTS

EP    0 140 558    5/1985

(Continued)

OTHER PUBLICATIONS

Taylor, M.A., Recent Developments in Ecloparasiticides, The Veterinary Journal, May 2001, vol. 161, No. 3, pp. 253-268.

(Continued)

*Primary Examiner*—Kevin C Sirmons
*Assistant Examiner*—Bhisma Mehta
(74) *Attorney, Agent, or Firm*—Bose McKinney & Evans LLP

(57) ABSTRACT

A dispenser is provided. The dispenser has a reservoir for storing a liquid or solid material. The dispenser may have a piezoelectric valve or pump located in an opening of the reservoir for regulating dispensing of the material. Alternatively, the dispenser may have a piezoelectric inchworm that directly or indirectly propels the material against or out of the opening. The opening may deposit the material directly or indirectly on the surface of an animal, or under the animal's skin. The dispenser also can be attached to the surface of the animal. Alternatively, the dispenser may be placed inside the animal.

8 Claims, 12 Drawing Sheets

U.S. PATENT DOCUMENTS

| | | | |
|---|---|---|---|
| 3,941,283 A | 3/1976 | Garbe | |
| 3,949,708 A | 4/1976 | Meeks | |
| 4,023,532 A | 5/1977 | Goodwin | |
| 4,184,453 A | 1/1980 | Ritchey | |
| 4,225,578 A | 9/1980 | von Bittera et al. | |
| 4,286,005 A | 8/1981 | Berger | |
| 4,354,889 A | 10/1982 | Berger | |
| 4,359,015 A | 11/1982 | Ritchey | |
| 4,366,777 A | 1/1983 | Akhavein et al. | |
| 4,381,782 A | 5/1983 | Mazurak et al. | |
| 4,399,821 A | 8/1983 | Bowers | |
| 4,425,117 A | 1/1984 | Hugemann et al. | |
| 4,425,874 A | 1/1984 | Child | |
| 4,428,327 A | 1/1984 | Steckel | |
| 4,495,898 A | 1/1985 | Akhavein et al. | |
| 4,506,630 A | 3/1985 | Hair | |
| RE31,940 E | 7/1985 | Ritchey | |
| 4,532,530 A | 7/1985 | Hawkins | |
| 4,532,892 A | 8/1985 | Kuzara | |
| 4,543,247 A | 9/1985 | von Bittera et al. | |
| 4,544,547 A | 10/1985 | Von Bittera et al. | |
| 4,562,794 A | 1/1986 | Speckman | |
| 4,579,085 A | 4/1986 | McGuire | |
| 4,596,575 A | 6/1986 | Rosenberg et al. | |
| 4,606,478 A | 8/1986 | Hack et al. | |
| 4,612,877 A | 9/1986 | Hayes | |
| 4,617,876 A | 10/1986 | Hayes | |
| 4,674,445 A | 6/1987 | Cannelongo | |
| 4,694,781 A | 9/1987 | Howe et al. | |
| 4,697,549 A | 10/1987 | Hair | |
| 4,718,374 A | 1/1988 | Hayes | |
| 4,721,064 A | 1/1988 | Denk et al. | |
| 4,750,284 A | 6/1988 | Parry et al. | |
| 4,854,328 A | 8/1989 | Pollack | |
| 4,865,044 A | 9/1989 | Wallace et al. | |
| 4,890,580 A | 1/1990 | Owen et al. | |
| 4,930,451 A | 6/1990 | Miller et al. | |
| 4,944,659 A | 7/1990 | Labbe et al. | |
| 5,044,114 A | 9/1991 | Haberer | |
| 5,046,453 A | 9/1991 | Vinci | |
| 5,074,252 A | 12/1991 | Morgan, Jr. | |
| 5,167,625 A | 12/1992 | Jacobsen et al. | |
| 5,190,220 A | 3/1993 | Bolton | |
| 5,318,557 A * | 6/1994 | Gross | 604/891.1 |
| 5,429,606 A * | 7/1995 | Robinson et al. | 604/97.03 |
| 5,582,593 A | 12/1996 | Hultman | |
| 5,618,269 A | 4/1997 | Jacobsen et al. | |
| 5,620,696 A | 4/1997 | Krzewki et al. | |
| 5,750,514 A | 5/1998 | Meyer | |
| 5,823,428 A * | 10/1998 | Humberstone et al. | 239/4 |
| 5,823,989 A | 10/1998 | Ostrow | |
| 5,894,841 A * | 4/1999 | Voges | 128/203.12 |
| 5,932,204 A | 8/1999 | Joshi | |
| 5,980,496 A * | 11/1999 | Jacobsen et al. | 604/289 |
| 6,056,734 A | 5/2000 | Jacobsen et al. | |
| 6,109,539 A | 8/2000 | Joshi et al. | |
| 6,113,539 A | 9/2000 | Ridenour | |
| 6,283,065 B1 | 9/2001 | Shorrok et al. | |
| 6,293,474 B1 | 9/2001 | Helf et al. | |
| 6,296,196 B1 | 10/2001 | Denen et al. | |
| 6,339,897 B1 | 1/2002 | Hayes et al. | |
| 6,341,732 B1 | 1/2002 | Martin et al. | |
| 6,367,925 B1 | 4/2002 | Chen et al. | |
| 6,375,649 B1 | 4/2002 | Jellie | |
| 6,378,780 B1 | 4/2002 | Martens, III et al. | |
| 6,382,522 B2 | 5/2002 | Tomkins et al. | |
| 6,386,462 B1 | 5/2002 | Martens, III | |
| 6,419,163 B1 | 7/2002 | Joshi et al. | |
| 6,436,069 B1 | 8/2002 | Jellie | |
| 6,439,474 B2 | 8/2002 | Denen | |
| 6,446,880 B1 | 9/2002 | Schram et al. | |
| 6,450,419 B1 | 9/2002 | Martens, III et al. | |
| 6,482,863 B2 | 11/2002 | Munagavalaa et al. | |
| 6,543,389 B2 | 4/2003 | Hedde | |
| 6,588,376 B1 | 7/2003 | Groh | |
| 6,664,897 B2 | 12/2003 | Pape et al. | |
| 6,668,760 B2 | 12/2003 | Groh et al. | |
| 6,669,682 B1 | 12/2003 | Gibson et al. | |
| 6,723,077 B2 * | 4/2004 | Pickup et al. | 604/305 |
| 6,758,000 B2 | 7/2004 | Sandt et al. | |
| 6,786,427 B2 | 9/2004 | Schram et al. | |
| 6,789,741 B2 | 9/2004 | Varanasi et al. | |
| 6,793,149 B2 | 9/2004 | Schramm et al. | |
| 6,800,070 B2 | 10/2004 | Mazidji et al. | |
| 6,835,386 B2 | 12/2004 | Gutierrez | |
| 6,843,430 B2 | 1/2005 | Boticki et al. | |
| 6,857,580 B2 | 2/2005 | Walter et al. | |
| 6,879,693 B2 * | 4/2005 | Miller et al. | 381/60 |
| 6,923,383 B1 * | 8/2005 | Joshi et al. | 239/302 |
| 6,962,579 B2 * | 11/2005 | Jellie | 604/891.1 |
| 2001/0050317 A1 | 12/2001 | Denen | |
| 2002/0087120 A1 | 7/2002 | Rogers et al. | |
| 2002/0088154 A1 | 7/2002 | Sandt et al. | |
| 2002/0158156 A1 | 10/2002 | Joshi et al. | |
| 2002/0192255 A1 | 12/2002 | Schiavo et al. | |
| 2003/0062001 A1 | 4/2003 | Andersson | |
| 2003/0212386 A1 | 11/2003 | Trompen et al. | |
| 2004/0161282 A1 | 8/2004 | Bolton | |
| 2004/0199116 A1 | 10/2004 | Trompen et al. | |
| 2005/0025979 A1 | 2/2005 | Sandt et al. | |
| 2005/0145187 A1 | 7/2005 | Gray | |
| 2006/0037557 A1 | 2/2006 | Gordon | |

FOREIGN PATENT DOCUMENTS

| | | |
|---|---|---|
| JP | 5065879 | 3/1993 |
| WO | WO 88/05314 | 7/1988 |
| WO | WO 98/01023 | 1/1998 |
| WO | WO 02/16048 | 2/2002 |
| WO | WO 03/028797 | 4/2003 |
| WO | WO 2004/066720 | 8/2004 |
| WO | WO 2004/089238 | 10/2004 |

OTHER PUBLICATIONS

Pipano, E., Recent Developments In The Control Of Ectoparasites And Endoparasites Of Dogs And Cats With Selamectin, Israel Journal of Veterinary Medicine, 2003, vol. 58, No. 2/3, pp. 38-45.

Bhushan, C., Evaluation Of The Efficacy Of Flumethrin (Bayticol®) Pour-On Against Cattle Ticks In India Under Field Conditions, The Indian Veterinary Journal, Feb. 1999, vol. 76, No. 2, pp. 62-64.

Rothwell, JT, Efficacy of zeta-cypermethrin as pour-on or spray formulations for the control of buffalo fly (Haematobia irritans exigua) in cattle, Australian Veterinary Journal, Sep. 1998, vol. 76, No. 9, pp. 610-612.

Dharmaraj, Benzene Hexachloride Toxicity In A Buffalo Calf—A Case Report, The Indian Veterinary Journal, , Feb. 2004, vol. 81, No. 2, pp. 86-87.

Molento, M.B., Persistent efficacy of doramectin pour-on against artificially induced infections of nematodes in cattle, Veterinary Parasitology, May 1999, vol. 82, No. 4, pp. 297-303.

Taylor, M.A., Treatment and Control of Ectoparasites of Cattle, Cattle Practice, 1997, vol. 5, Part 4, pp. 279-282.

Uzuka, Y., Chemical Control of Haematobia irritans with 0.5% Topical Ivermectin Solution in Cattle, The Journal of Veterinary Medical Science, Mar. 1999, vol. 61, No. 3, pp. 287-289.

Filtrona Fibertec Website printout—Cellulose Acetate Reservoirs, (printed May 9, 2006)—1 page, http://www.filtronafibertec.com/BondedFiberComponents/3b56fa77-7f03-4aed-bcb5-c98a91ce33a6.htm.

* cited by examiner

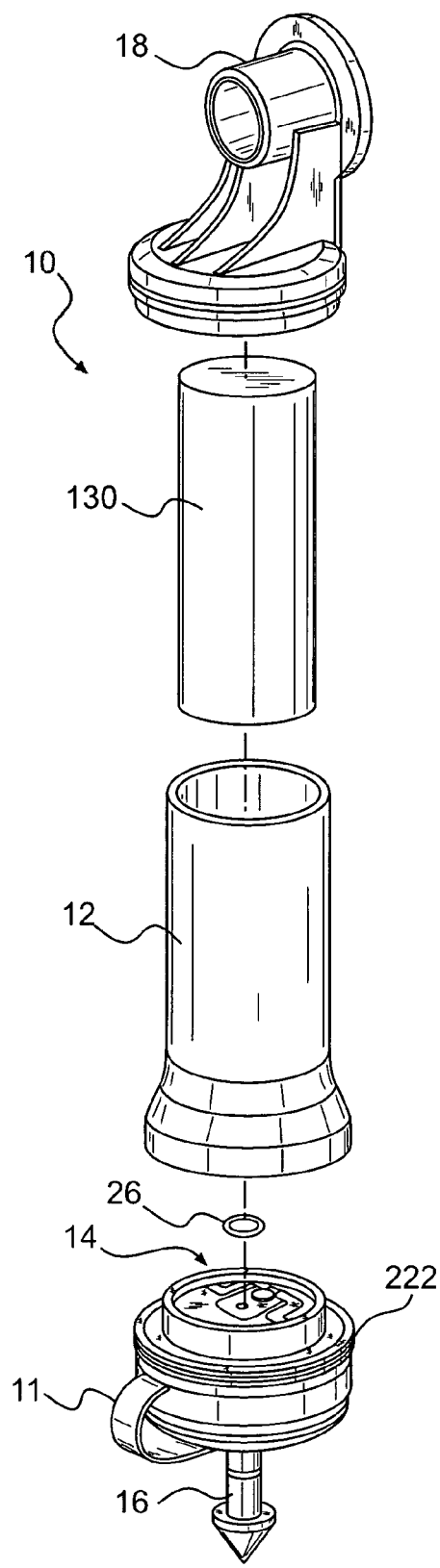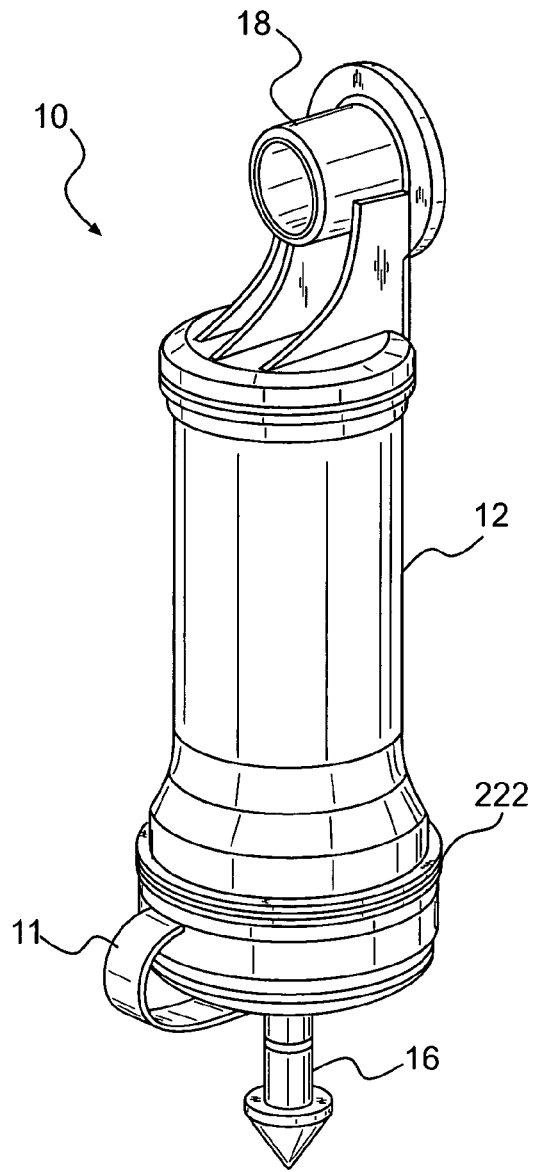
FIG. 1
FIG. 14

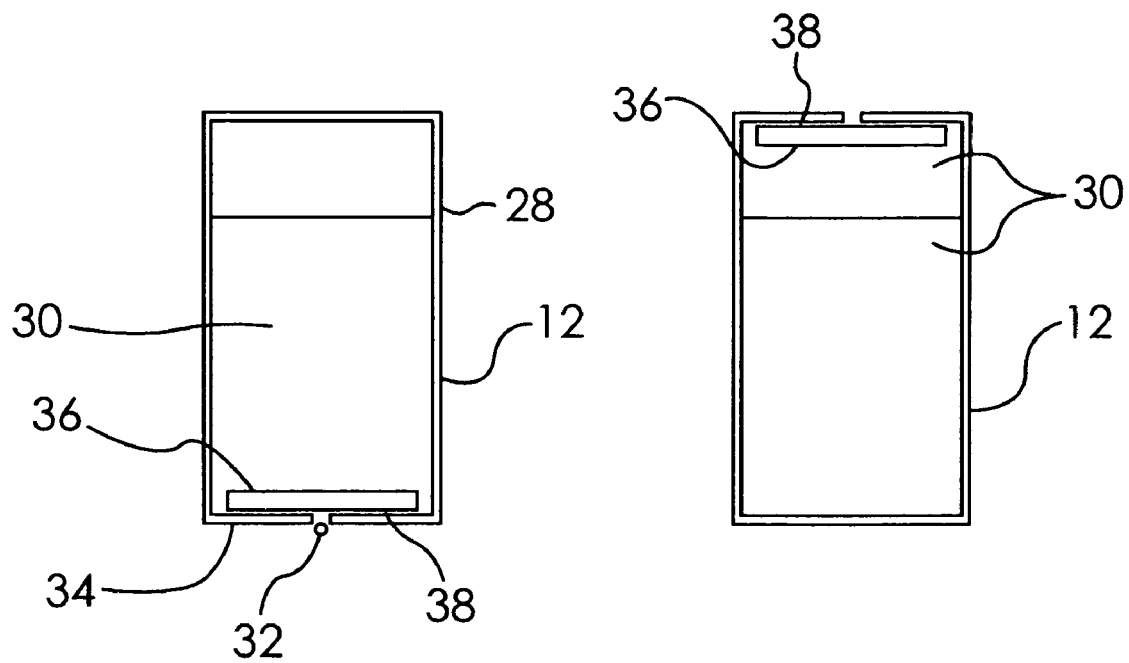

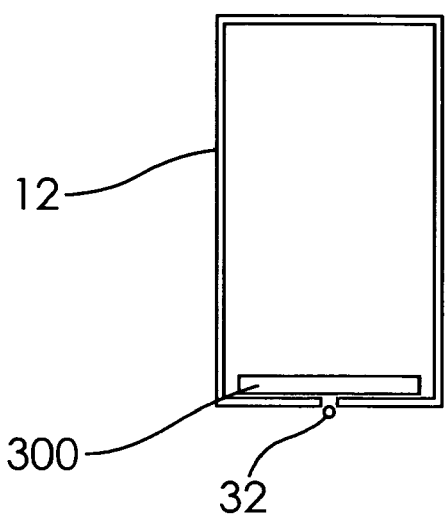 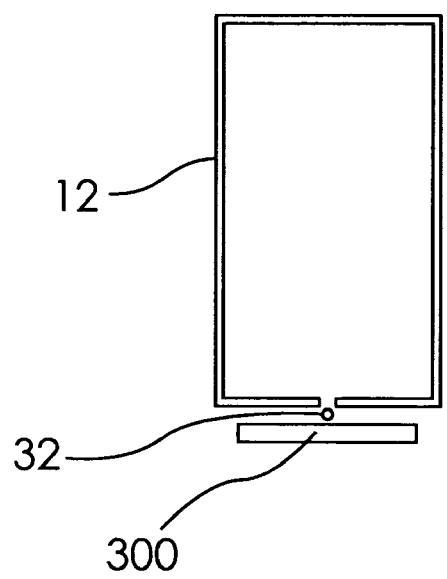
Fig. 17  Fig. 18

DISPENSER HAVING PIEZOELECTRIC ELEMENTS AND METHOD OF OPERATION

FIELD OF THE INVENTION

The invention relates to a dispenser for small quantities of liquids or solids, in particular a dispenser having one or more piezoelectric elements regulating the rate of dispensation.

BACKGROUND OF THE INVENTION

Currently there are various methods used in control of pests on large domestic animals such as livestock. Commonly employed methods of pest control include ear tags or tapes, sprays and dusts, and back rubbers and dust bags.

Ear tags or tapes are pesticide-impregnated materials which are attached to animals by piercing the ear with a sharp post and corresponding locking receptacle or with adhesive. The pesticide slowly leaches from the carrier material and is deposited to the animal. The animal will then spread the material by moving its head from side to side and by rubbing alongside other animals.

This method of pesticide application tends to have a diminishing effect through its life cycle as the pesticide level eventually runs low enough that sub-lethal amounts of pesticide are deposited on the animal. This poses a serious problem, as sub-lethal applications of pesticide will allow pests to build a tolerance to the pesticide. Future generations of pests may subsequently become immune to what were once lethal exposures to the pesticide.

Sprays, dusts, and pour-on applications of pesticide involve the manual application of pesticide to the animal's back. Although this method can be effective, it requires additional herding and handling and may not be practical for large ranches or for free-range cattle.

Back rubbers and dust bags impregnated or filled with pesticide and suspended in a pasture in proximity to a salt lick, water supply or place where the animals are known to rest. The animals will make contact with the device in the normal course of their routine. In addition, the dust bag or back rubber may be located in a gateway which leads to a salt lick or water supply and which forces the animal to contact the device. Again, this method of insecticide application can be effective, but may not be practical for certain situations such as large ranches or free-range cattle.

It would be desirable to have an application method and dispenser that is capable of dosing a repeatable, prolonged, and lethal application of pesticide to an animal with no gradual decline, but rather, a sudden and complete cessation of exposure, and does not require further herding, handling or contact with the animal.

BRIEF SUMMARY OF THE INVENTION

A dispenser is provided. The dispenser has a reservoir for storing a liquid or solid material. The dispenser may have a piezoelectric valve or pump located in an opening of the reservoir for regulating dispensing of the material. Alternatively, the dispenser may have a piezoelectric inchworm that directly or indirectly propels the material against or out of the opening. The opening may deposit the material directly or indirectly on the surface of an animal, or under the animal's skin or into the gastro-intestinal tract. The dispenser also may have means for being attached to the surface of the animal. Alternatively, the dispenser may be placed inside the animal.

DESCRIPTION OF THE DRAWINGS

FIG. 1 is an exploded view of a first embodiment of the invention.

FIGS. 3-7 are cross sectional views of a third embodiment of the invention.

FIG. 14 is a perspective view of the first embodiment.

FIGS. 17 and 18 are diagrammatic views illustrating an inchworm device relative to a reservoir.

DETAILED DESCRIPTION OF THE INVENTION

Figure 2:
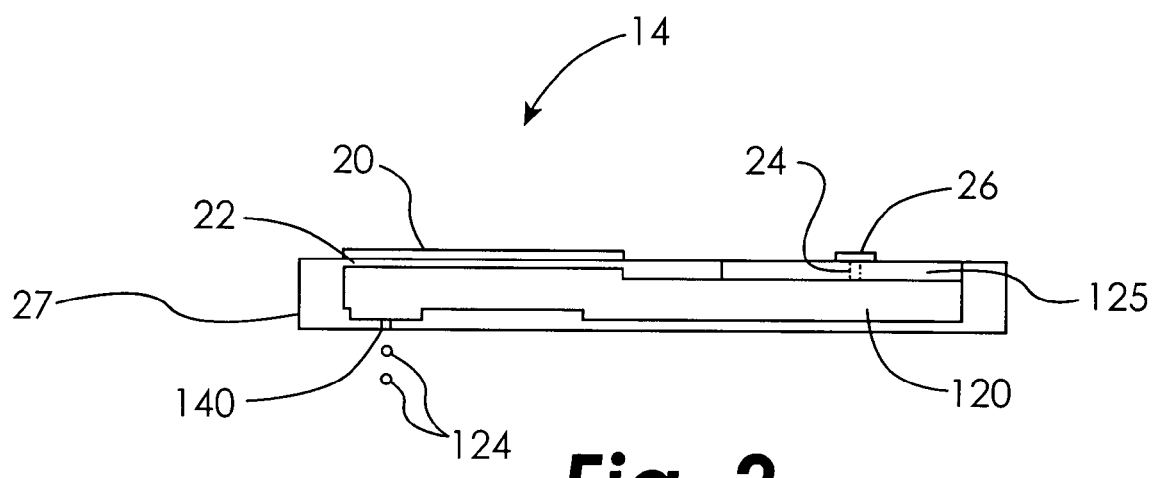
FIG. 2 is a side view of a second embodiment of the invention.

The device has a reservoir containing a material to be dispensed. The device also has one or more piezoelectric elements that act as a pump or as a valve to deliver prescribed and discrete measures of liquid or solid material. The piezoelectric elements may work in concert with other materials such as metal, plastic, ceramics, composite materials, etc. to form the complete pump/valve assembly. In addition, the piezoelectric element is coupled with an electronics array to control dose timing and actuation frequency. The electronics array will control dose timing and actuation frequency by controlling the supply of electrical energy to the piezoelectric element. There are several known methods for applying piezoelectric elements to fluid/liquid transfer, such as those used in some types of inkjet printers.

The dispenser may be designed to be attached to the surface of an animal, typically a domestic animal, in which case it will include an attachment means for maintaining the dispenser in position. Attachment means such as tissue piercing posts and grommets, tapes, adhesives, collars, harnesses, clamps, and staples or other means may be used. Depending upon the means by and location at which the dispenser is attached, retention may be achieved by an externally mounted structure, an internally mounted weight, or using the weight of the assembled dispenser itself.

The reservoir may be designed as a permanent component of the overall assembly or it may be removable and replaceable. In either case, the piezoelectric pump/valve will be coupled to the reservoir and the pesticide or other material will be transferred from the reservoir to the exterior of the device and eventually be deposited on the animal. The piezoelectric element may be adjacent to the reservoir or in the reservoir including in an opening of the reservoir.

The reservoir may include a one-way valve to allow air to enter the system as the pesticide or other material is transferred from the reservoir. In another embodiment, the reservoir may include an open cell foam sponge which will serve to keep the system primed by means of capillary action. The sponge will work in concert with a vent which is open to atmosphere. This technology is commonly applied to inkjet printing cartridges. In another embodiment, the reservoir may include a collapsible, flexible bladder to avoid drawing a vacuum as the pesticide or other material is transferred from the reservoir. The bladder design will also eliminate the entry of air to the liquid, which may disrupt the transfer of the pesticide or other material from the reservoir. Similarly, the reservoir may be designed along the lines of a syringe to accomplish the same task. As the pesticide or other material is transferred from the reservoir, the syringe piston will move to maintain a constant and predictable system pressure without the introduction of air to the liquid. In another embodiment, the device may dispense under vacuum. In this embodiment the piezoelectric pump or valve may be capable of dispensing the liquid as the system pulls a vacuum condition, eliminating the need for venting the reservoir.

In one embodiment the piezoelectric element is a valve or pump located in an opening of the reservoir. FIG. 1 shows an example of this embodiment. The dispenser 10 has a primary reservoir 12 containing the material to be dispensed. As noted above, the primary reservoir 12 includes an optional open cell sponge material 130 which maintains the system primed by means of capillary action. The device 10 has a piezoelectric element in the form of a piezoelectric pump or valve 14 located inside to regulate the flow of the material being dispensed. The embodiment illustrated in FIG. 1 has a means for attaching the dispenser to the surface of an animal. In this case, the means comprises a post 16 which is meant to be removed from the device and placed through a piercing in the animal, for example in the animal's ear. Tape 11 in this embodiment is a nonconductive tape that covers one of the terminals of an internal battery. The tape is attached to post 16 so that when the post is removed from the device, the tape is also removed, allowing the internal battery to supply power to the piezoelectric element. After the post is passed through the piercing, locking ring 18 receives the end of the post to secure the dispenser in place, thereby serving as a grommet.

Figure 15:
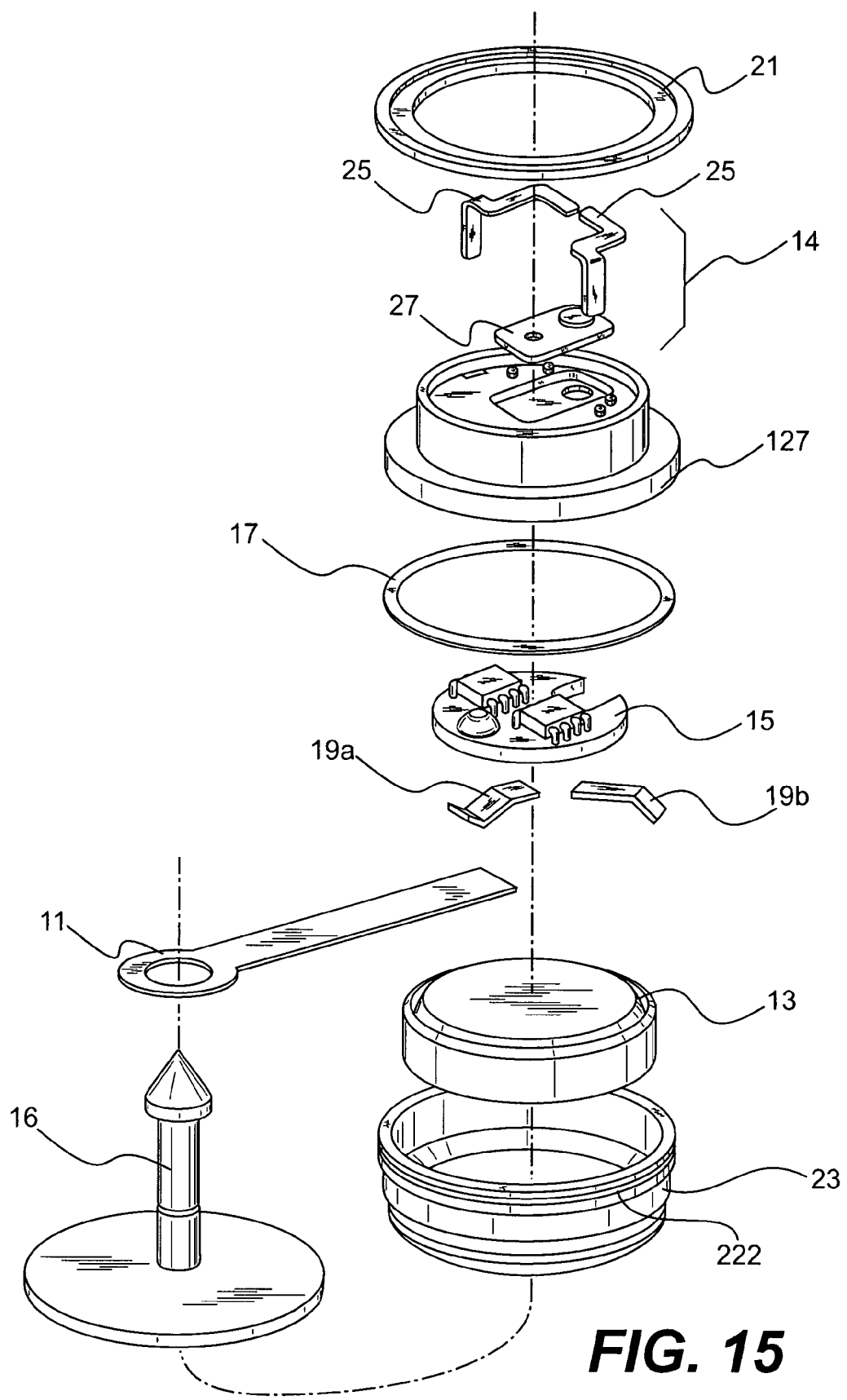
FIG. 15 is an exploded view of the lower section of the first embodiment.
Figure 15A:
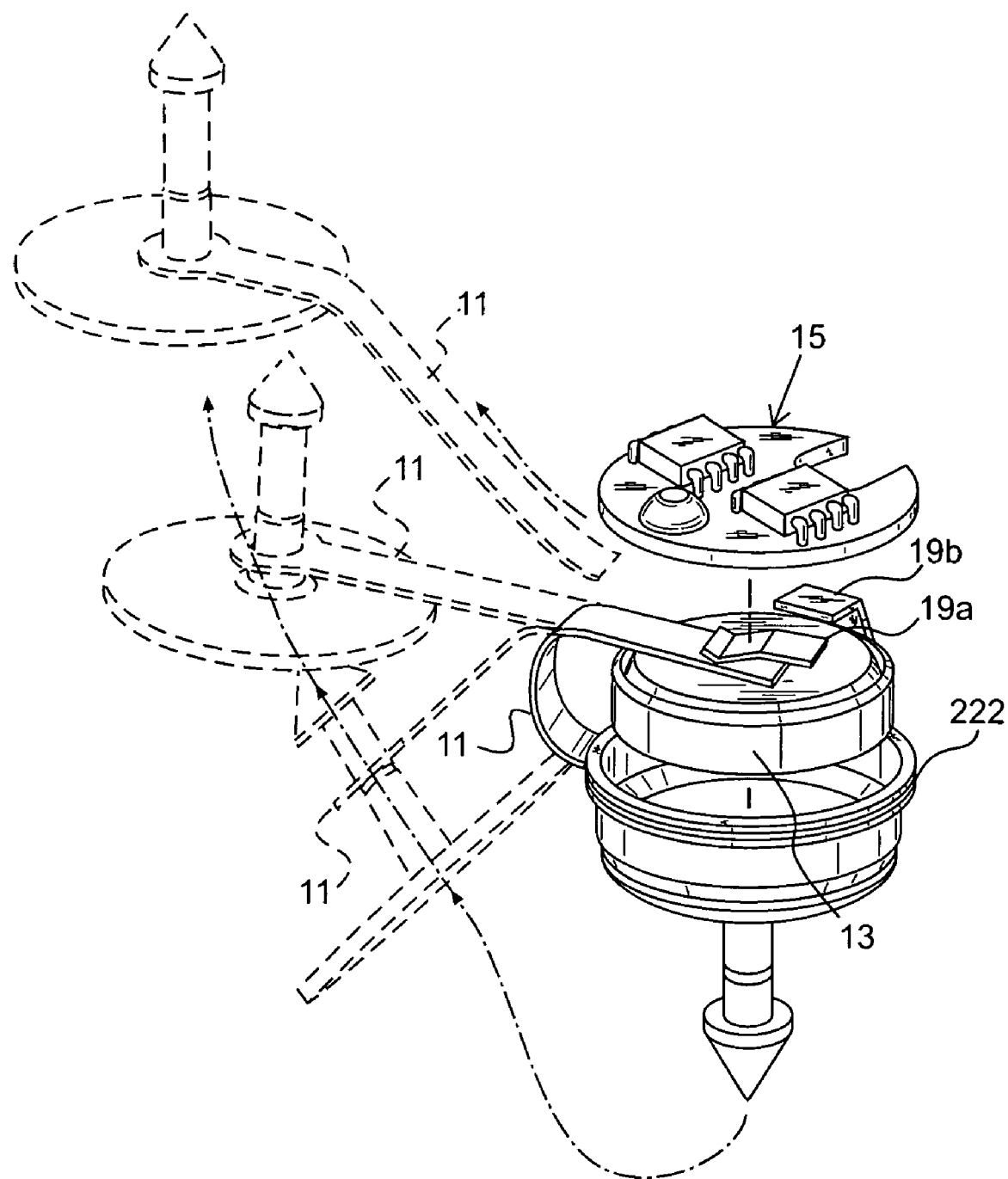
FIG. 15a is an exploded view of the lower section of the first embodiment illustrating the removal of a non-conductive tape to complete a circuit and activate the dispenser.

FIG. 15 shows the lower section of the device 10 in an exploded view. Tape 11 is shown separated from post 16. The post is fit to battery cover 23 when the device is assembled. Contacts 19a and 19b connect battery 13 to electronics 15. As mentioned above, when post 16 is removed, tape 11 is also removed, allowing a circuit between battery 13 and electronics 15 to be completed. This is depicted in FIG. 15a. The electronics control piezoelectric element 14, which has piezoelectric contacts 25 and piezoelectric stack 27. The electronics are contained in and the piezoelectric element is mounted on electronics housing 127. Absorbent material 21 is also mounted on the electronics housing in the completed device. O-ring 17 allows a tight seal between the battery cover and the electronics housing.

Figure 3:
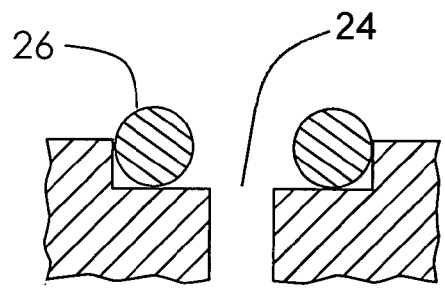
Figure 16:
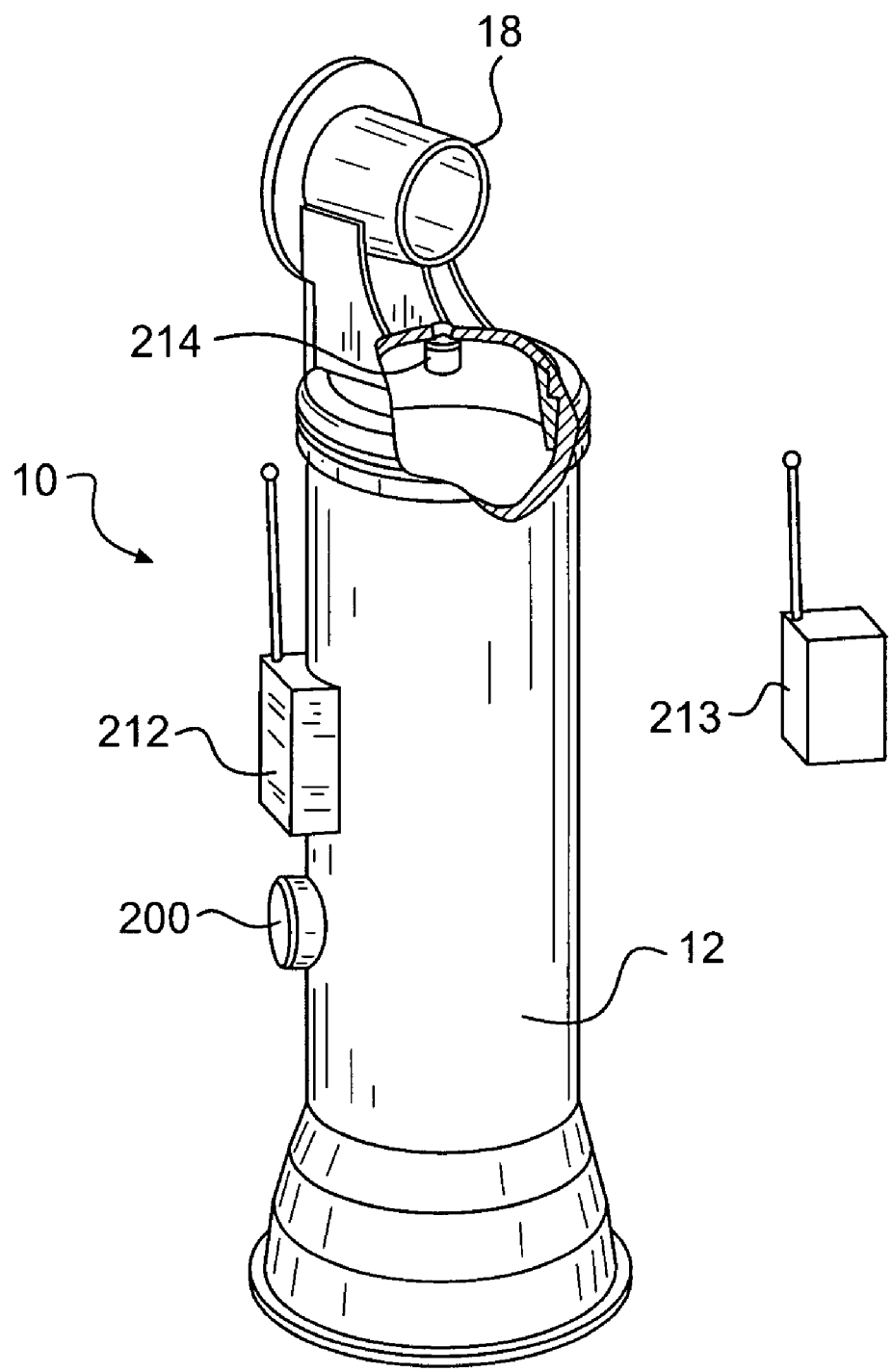
FIG. 16 is a perspective view of another embodiment of the dispenser.
Figure 16A:
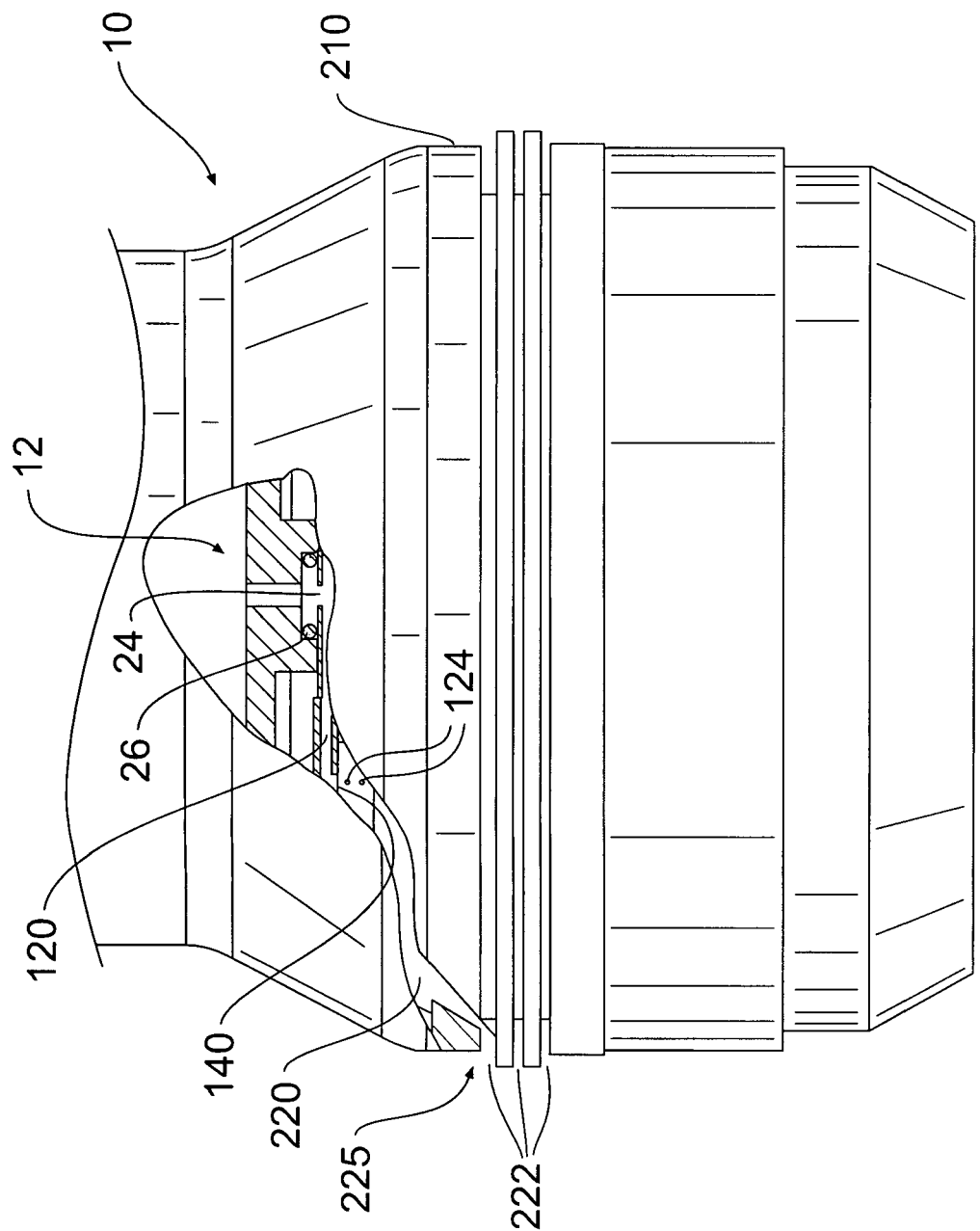
FIG. 16a is an enlarged perspective view with portions broken away of the lower part of a dispenser.

In one embodiment the piezoelectric element is located in or adjacent to either the reservoir or a chamber in fluid communication with the reservoir. By pulsing current through the piezoelectric element it is possible to expand the element, thereby reducing the space in the reservoir or chamber and forcing a small amount of liquid out of the reservoir or chamber. By pulsing current at a high frequency it is possible to expel a large number of droplets of fluid from the opening. FIGS. 2 and 16a show an example of this embodiment. The piezoelectric stack 27 of piezoelectric pump or valve 14 has a chamber 120 having an outlet 140. With reference to FIG. 16a, piezoelectric stack 27 is in liquid communication with reservoir 12 and secondary reservoir 220, such that the liquid to be dispensed passes through the piezoelectric element. Portion 20 of piezoelectric element 14 expands and contracts as voltage is pulsed through it, causing it to press and release against flexible wall 22. This causes droplets or particles of material 124 to pass through outlet 140. The illustrated embodiment in FIG. 2 also shows optional inlet 24 and optional filter 125. Element 26 shown in FIG. 3 is an o-ring which is used to couple the piezoelectric stack 27 to the reservoir 12 shown in FIGS. 1, 4 and 5. That is, an additional container such as reservoir 12 holding material to be dispensed may be connected to piezoelectric stack 27 via inlet 24, such that piezoelectric stack 27 is in fluid communication with reservoir 12. As also noted (see FIG. 16a), piezoelectric element 27 is in fluid communication with secondary reservoir 220. As just mentioned, in such cases it may be desirable to interpose a filter 125 (FIG. 2) between the inlet 24 and the outlet 140 to prevent outlet 140 from being clogged by environmental contamination.

Figure 19A:
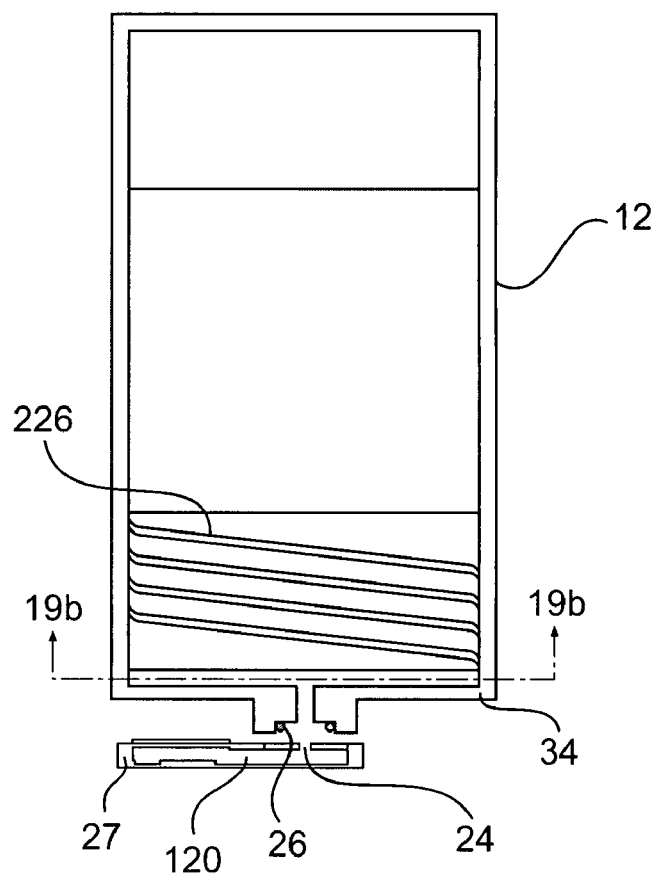
FIGS. 19a and 19b are diagrammatic views illustrating an internal capillary action means.
Figure 19B:
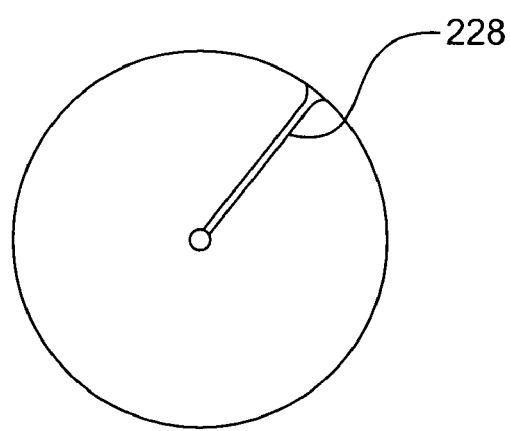

FIG. 3 shows a close-up detail of inlet 24. The inlet would typically contain an o-ring 26 to firmly seat an additional container. FIGS. 4 and 5 are schematic diagrams of an additional container suitable for use in the present invention. The container 28 defines a reservoir 12 like that shown in FIG. 1 that contains material 30 to be passed into the piezoelectric element. The container has an opening 32 in wall 34 with means to couple to inlet 24 of piezoelectric stack 27. The illustrated container also contains an internal capillary action means consisting of an optional plate or filter 36 of fibrous or porous material (e.g., material 130 shown in FIG. 1) disposed adjacent to wall 34, defining a capillary channel 38 between the plate or filter 36 and the wall 34. The optional plate or filter or disc 36 may be used when the material 30 is a liquid material. This capillary channel ensures that if the container is inverted so that the material falls away from opening 32, a small amount of the liquid material will remain in the capillary channel 38. This is useful to reduce the likelihood of chamber 120 of piezoelectric element 14 emptying of material and becoming filled with air, as such an event could disrupt the proper pumping function of the piezoelectric element. In another embodiment shown in FIGS. 19a and 19b, a different internal capillary action means could be used, such as a series of grooves or small passages 226 and 228 leading directly to the inlet 24 of the piezoelectric element 14.

The device may also incorporate piezoelectric inchworm technology to eject a material from an element such as a syringe. In addition, the inchworm device could be used to advance a solid material through the end of a tube or similar device. Piezoelectric inchworm devices are comprised of several piezoelectric elements, which work together to produce a mechanical movement of the piezoelectric elements in a tube or along a rod or similar component. Alternatively, the piezoelectric elements may remain stationary while causing movement of another element such as a rod. FIGS. 17 and 18 schematically show a piezoelectric inchworm 300 disposed in reservoir 12 (FIG. 17) or adjacent to reservoir 12 (FIG. 18).

Figure 6:
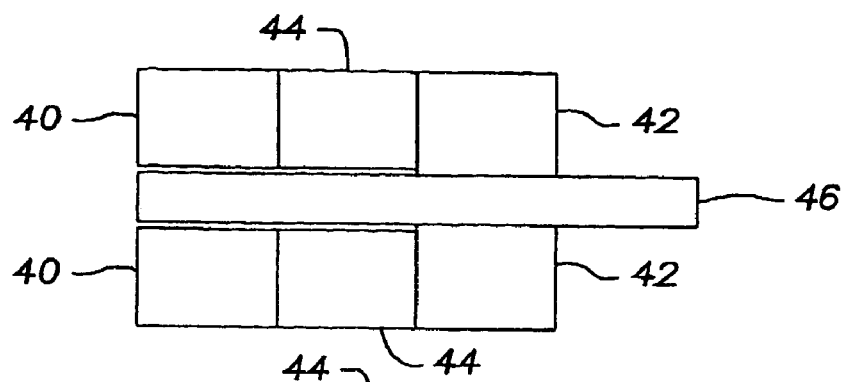
Figure 7:
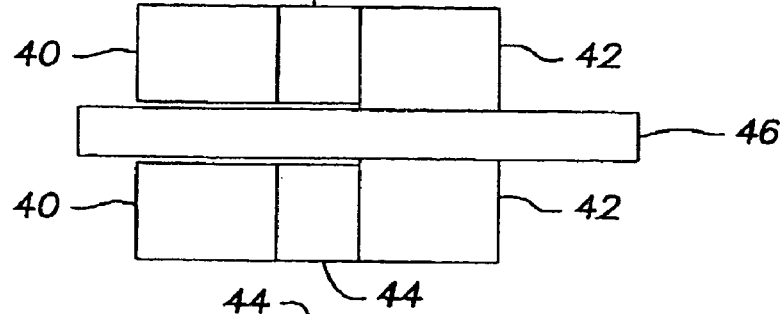
Figure 8:
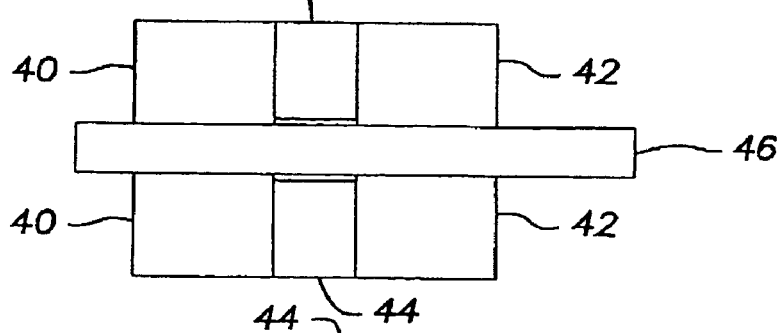
FIGS. 8-10 are cross sectional views of a fourth embodiment of the invention.
Figure 9:
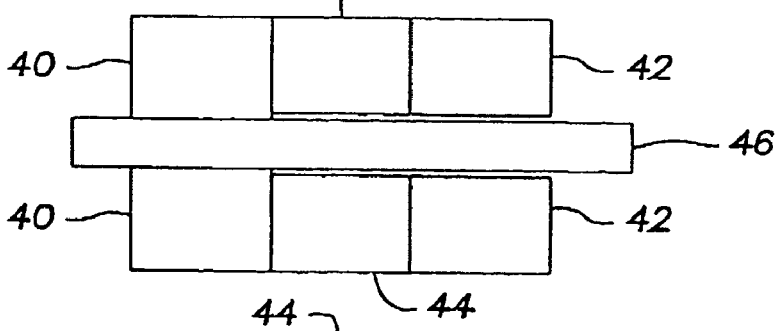
Figure 10:
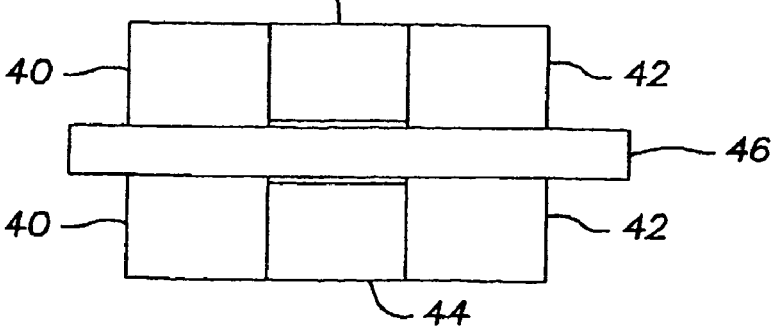

FIGS. 6 through 10 illustrate the operation of an inchworm device having ring-shaped piezoelectric elements 40, 42, 44 shown in cross-section operating to move the inchworm along a rod 46. Elements numbered 40 and 42 expand and contract radially with respect to the rod, while elements 44 expand and contract axially with respect to the rod. In FIG. 6 elements 40 are contracted, elements 44 are expanded, and elements 42 are expanded to clamp against rod 46. FIG. 7 demonstrates the next step, in which elements 44 contract, pulling elements 40 toward elements 42. FIG. 8 shows the succeeding step, in which elements 40 expand to clamp against rod 46. FIG. 9 shows the assembly after elements 42 contract, releasing their grip on rod 46, and elements 44 expand, moving elements 42 away from elements 40. In FIG. 10 elements 42 once again expand to clamp on rod 46. The cycle repeats as elements 40 contract to release their grip on the rod, resulting in the situation as shown in FIG. 6. Of course, if either elements 40 or 42 were fixed in place against a stationary surface, then the same process could be used to impart axial movement to a movable rod rather than moving the inchworm along a fixed rod. Furthermore, it would be possible to operate the inchworm using a set of piezoelectric elements adjacent to a rod, rather than ring-shaped elements as shown in FIGS. 6 through 10.

Figures 11, 12, 13:
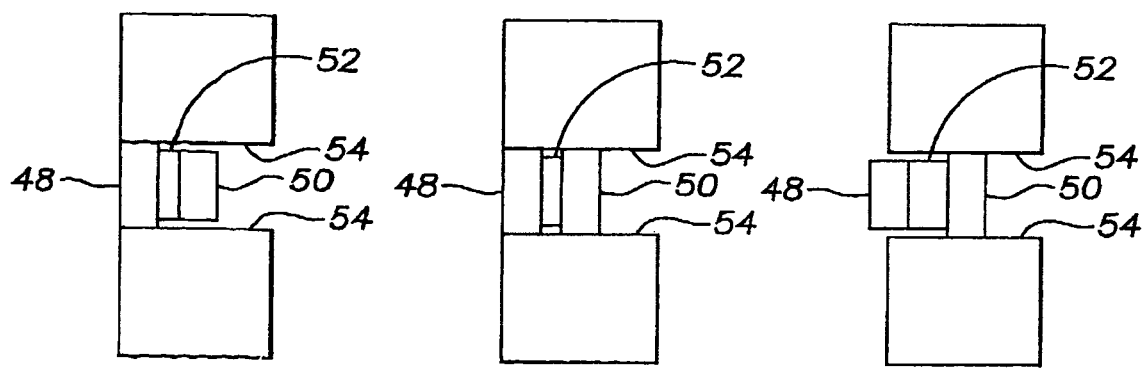
FIGS. 11-13 are cross sectional views of a fifth embodiment of the invention.

FIGS. 11 through 13 show another embodiment of the inchworm, in which the inchworm has piezoelectric elements 48, 50, and 52 which move through a tubular space defined by walls 54. Elements 48 and 50 expand and contract radially to fit against the walls 54 of the space, while element 52 expands axially along the direction of movement. FIG. 11 shows element 48 expanded against walls 54, element 50 contracted to move freely, and element 52 contracted. FIG. 12 shows the situation after element 50 expands to fit against walls 54, and FIG. 13 shows the situation after element 48 contracts to release its grip on walls 54 and element 52 expands to move element 48 away from element 50. Following these steps, element 48 would expand again, element 50 would contract to release its grip on walls 54, and element 52 would contract again, at which point the assembly is returned to the configuration shown in FIG. 11, but displaced in the direction of travel.

In another embodiment, the device may be entirely or partially implanted in an animal in a known manner in order to dose pesticides, therapeutic agents, growth hormones, medicines, drugs, etc. If the animal is a ruminant, the entire device may also be deposited to the animal's rumen with a balling gun. Intraruminal devices for dispensing drugs, medicine, hormones, etc. are disclosed in co-pending application Ser. No. 10/141,300, the contents of which are incorporated herein in their entirety. Such devices generally contain a housing with externally mounted retention device such as a pair of plastic "wings", or else are weighted to prevent their being passed out of the rumen. The device may also be attached to the animal with only a small portion of the device implanted under the skin of the animal to act as a passage for the dosing of a desired material.

The device can dose a discrete amount of material on demand, on a prescribed timed interval or it may dose continuously and indefinitely over an extended time period until the insecticide or other material is exhausted.

In addition, since the primary delivery is not through diffusion and is not dependent on high solubility of a parasiticide in a polymer matrix, the fluid utilized in the present invention can be expanded to include previously unusable parasiticides and still include compounds previously dissolved in polymer matrices. These include, but are not limited to various avermectins, benzimidazoles, milbemycins, carbamates, organophosphates, phenylpyrazoles, amidines, insect growth regulators, juvenile hormones, nicotinoids, pyrroles and naturalytes (i.e., the spinosyn family). Representative compounds may include abamectin, doramectin, eprinomectin, selamectin, alphamethrin, amitraz, coumaphos, ivermectin, deltamethrin, cyhalothrin, diazinon, cyromazine, cypermethrin, milbemycin, cyfluthrin, cyloprothrin, famphur, fenthion, fenvalerate, flucythrinate, flumethrin, fipronil, hexaflumaron, imidacloprid, lindane, lufenuron, malathion, methoprene, metriphonate, moxidectin, permethrin, pyrethrin, pyrethrum, phomet, pirimiphos, chlorvinphos, rotenone, propetamphos, tetrachlorvinphos, zetacypermethrin, chlorpyrifos and spinosad, among others.

In another embodiment, the actuation of the device may be controlled by a centrally located RF (radio frequency) transponder. Each device in this embodiment will incorporate a RF receiver which will allow an operator to transmit instructions to the electronics array. This RF technology could be used to deliver insecticide or other materials on demand or it could be used to change the program, dose frequency, dose amount, rate of delivery, etc. It would also be possible to use the RF signal as the power source for the device, thus greatly reducing the weight by avoiding the use of batteries.

The device may be activated initially by the user in a number of ways. In one embodiment, the user may remove an insulating strip located between an electrical contact and battery or between two electrical contacts. The strip may be removed by attaching it to an integral component of the device, such as a piercing post, such that any attempt to use the post to mount the device would necessarily force the user to remove the strip. This is depicted in FIG. 15*a*. The strip may also be attached to the packaging of the device. As the device is removed from the package, the strip is pulled out and the device is activated. In another embodiment, the device may be activated with a push button or a similar device. FIG. 16 illustrates device 10 having pushbutton 200, radio frequency receiver 212 and one way valve 214. In one embodiment, a separate radio frequency transponder 213 allows communication between an operator and the electronics array 15. In another embodiment, the device may be delivered to the user with an integral part, such as the piercing post, inserted into the device, such that the integral part holds a circuit in the open position. When the user removes the integral part prior to making use of the device, the circuit would close. In the alternative, the part may make momentary contact with a circuit to initiate a pre-programmed response of activating the device.

In another embodiment, a photovoltaic cell or similar device may be used to activate the device. The device may be activated as it is removed from its packaging and exposed to light. The device may be activated as a strip covering the photovoltaic cell or similar device is removed and exposed to light. The device may be activated as an integral component such as the male piercing post is removed from a section of the device to attach the device to an animal. The piercing post could be situated such that it covers the photovoltaic cell until it is removed for use. In another embodiment, the device may be powered by a capacitive device.

Figure 15B:
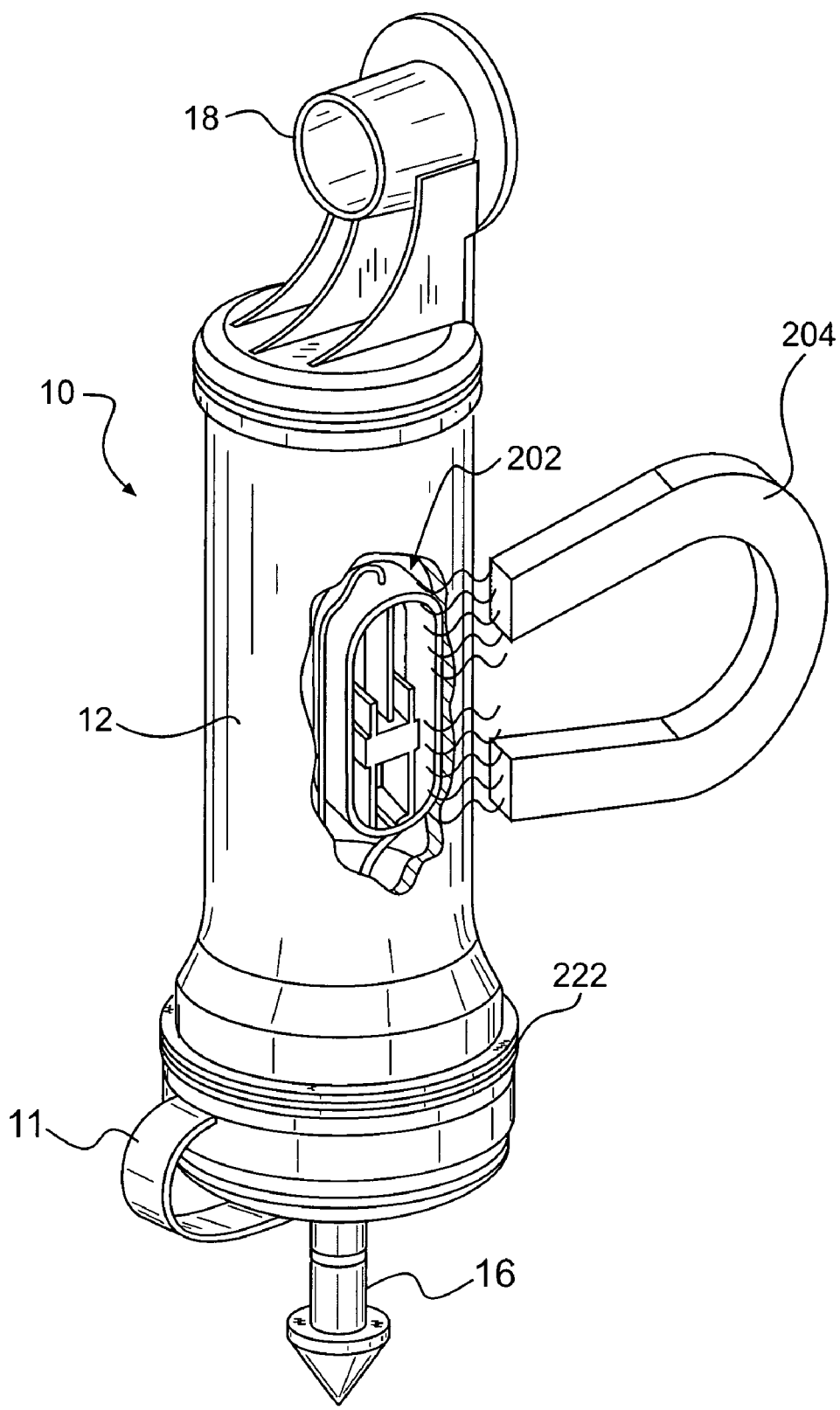
FIG. 15b is a perspective view illustrating an embodiment having a magnetic reed switch to activate the dispenser.

The device may be activated as the piercing post is seated to the retention grommet. This action may complete a circuit or break a circuit or make momentary contact to initiate activation. The device may also be activated with a magnetic reed switch and a magnetic application tool, such as magnetic reed switch 202 and magnet tool 204 depicted in FIG. 15*b*.

The device may be powered with a battery or photovoltaic device and a voltage converter. In another embodiment, the device could be powered with another piezoelectric element such as a bender. The bender could be actuated through movement from the animal or from the animal's pulse and the produced voltage could be stored. The stored energy could then be used to power the piezoelectric element and associated electronics that control the pump/valve assembly. In another embodiment, the device could be powered by the animal's body temperature and a thermoelectric device or thermoelectric pile to generate a current. The produced current could be stored. The stored energy could then be used to power the piezoelectric element and associated electronics that control the pump/valve assembly.

In another embodiment, the device could be powered with a device similar to a self-winding watch mechanism where the mechanical energy derived from the concentric motion of the device is converted to electrical energy and stored. The stored energy could then be used to power the piezoelectric element and associated electronics that control the pump/valve assembly.

The pesticide or other material may be transferred directly to the surface of the animal, to its skin or fur. Another embodiment would direct the pesticide or other material to an absorbent material, sponge, felt, cloth or other absorbent or porous material in proximity to the animal's skin or fur. The material will be such that it can retain the liquid pesticide or other material without a measurable or significant portion being released in droplet form and falling to the ground. Through the animal's normal movements, the liquid would be rubbed off to the animal's skin or fur. In another embodiment shown in FIG. 16*a*, the external surface 210 of the device 10 would have an external capillary action means such as a series of grooves 222 molded adjacent the outlet 140 of the piezoelectric pump or valve 14. As noted above and as depicted in FIG. 16*a*, pulsing electric current through piezoelectric stack 27 causes droplets of material 124 to pass through outlet 140 and be received and collected in secondary reservoir 220, and exit the secondary reservoir outlet or opening 225. The grooves 222 are in communication with the outlet 140 and capture and retain the expelled liquid on the exterior surface of the device, allowing it to eventually contact the animal. The capillary action means may be used in conjunction with the absorbent material, or by itself. In other words, the pesticide or other material is directed to a secondary and exterior reservoir or surface of the device, which allows the insecticide to collect or pool and eventually roll onto the animal. The secondary reservoir or surface defines an opening or outlet 225 (FIG. 16*a*) and is located such that there is a high probability that the collected pool of pesticide or other material will make contact with the animal and not be lost by dropping to the ground.

Once the pesticide or other material has reached the animal, it is spread further through the animal's normal movement and interaction with other animals. As the animal moves it head from side to side and rubs along other animals, the pesticide or other material is spread along the entire length of the animal.

While the device has been discussed in the context of large domestic animals such as ruminants, it would be equally suitable for use with smaller domestic animals, such as companion animals.

Although the preferred embodiments of the invention have been shown and described, it should be understood that various modifications and changes may be resorted to without departing from the scope of the invention as disclosed and claimed herein.

We claim:

1. A dispenser for dispensing a liquid onto an animal, comprising:

a primary reservoir configured to hold the liquid;

a piezoelectric element disposed adjacent or in the primary reservoir, the piezoelectric element having an inlet to receive liquid from the primary reservoir and an outlet for the liquid to exit;

an internal capillary action means adjacent the inlet of the piezoelectric element;

an external capillary means disposed on the exterior of the dispenser and being in liquid communication with the piezoelectric outlet, the external capillary means being configured to allow the liquid exiting the piezoelectric outlet to collect or pool in or on the external capillary means and eventually roll from the external capillary means onto the animal; and a secondary reservoir in fluid communication with the outlet of the piezoelectric element.

2. The dispenser of claim 1, wherein the internal capillary action means comprises a capillary channel.

3. The dispenser of claim 1, wherein the internal capillary action means comprises a fibrous or porous material.

4. The dispenser of claim 1, wherein the external capillary means comprises at least one groove.

5. The dispenser of claim 1, further comprising an electronics array for controlling electrical energy supplied to the piezoelectric element, thereby regulating the flow of liquid from the outlet.

6. The dispenser of claim 5, further comprising a power source for providing electrical energy to the electronics array and piezoelectric element.

7. The dispenser of claim 1, further comprising an attachment means for attaching the dispenser to the animal.

8. The dispenser of claim 1, wherein the external capillary means is configured to collect and retain liquid such that there is a high probability that the collected liquid will make contact with the animal and not be lost by dropping to the ground.

* * * * *